United States Patent
Iguchi et al.

(10) Patent No.: US 12,014,879 B2
(45) Date of Patent: Jun. 18, 2024

(54) MULTILAYER ELECTRONIC COMPONENT

(71) Applicant: TDK CORPORATION, Tokyo (JP)

(72) Inventors: Toshihiro Iguchi, Tokyo (JP);
Yoshitaka Nagashima, Tokyo (JP);
Yasuhiro Okui, Tokyo (JP); Masahide Ishizuya, Tokyo (JP); Yuuki Hidaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 70 days.

(21) Appl. No.: 17/903,302

(22) Filed: Sep. 6, 2022

(65) Prior Publication Data
US 2023/0072034 A1 Mar. 9, 2023

(30) Foreign Application Priority Data
Sep. 8, 2021 (JP) .................... 2021-145969

(51) Int. Cl.
*H01G 4/30* (2006.01)
*H01G 4/012* (2006.01)
*H01G 4/12* (2006.01)

(52) U.S. Cl.
CPC .............. *H01G 4/30* (2013.01); *H01G 4/012* (2013.01); *H01G 4/12* (2013.01)

(58) Field of Classification Search
CPC .............. H01G 4/12; H01G 4/012; H01G 4/30
USPC ................ 361/301.4, 311, 312, 321.1, 321.2
See application file for complete search history.

(56) References Cited

U.S. PATENT DOCUMENTS

| | | | |
|---|---|---|---|
| 2006/0087796 A1* | 4/2006 | Yamazaki | C04B 35/4682 361/321.2 |
| 2016/0225526 A1* | 8/2016 | Endo | H01G 4/30 |
| 2020/0185152 A1* | 6/2020 | Uchida | H01G 4/012 |
| 2021/0020376 A1* | 1/2021 | Sasabayashi | H01G 4/1227 |
| 2021/0035740 A1* | 2/2021 | Kim | H01G 4/30 |

FOREIGN PATENT DOCUMENTS

JP 2016-160133 A 9/2016

OTHER PUBLICATIONS

Cain et al.; "Univariate and multivariate skewness and kurtosis for measuring nonnormality: Prevalence, influence and estimation;" Behav Res; 2016; pp. 1716-1735; vol. 49.5.

* cited by examiner

*Primary Examiner* — Arun Ramaswamy
(74) *Attorney, Agent, or Firm* — Oliff PLC

(57) ABSTRACT

A multilayer electronic component includes a plurality of dielectric layers and a plurality of electrode layers that are alternately stacked. A skewness of a distribution of thicknesses of the plurality of dielectric layers at a plurality of arbitrary locations of the plurality of dielectric layers is 0.2 or more.

5 Claims, 4 Drawing Sheets

MULTILAYER ELECTRONIC COMPONENT

TECHNICAL FIELD

An aspect of the present disclosure relates to a multilayer electronic component.

BACKGROUND

Japanese Unexamined Patent Publication No. 2016-160133 discloses a multilayer ceramic capacitor that is a kind of multilayer electronic component. The multilayer ceramic capacitor described in the Patent Publication is formed by alternately stacking dielectric layers and internal electrode layers.

The multilayer electronic component described above is required to improve the high temperature load life in order to improve the reliability. In addition, it is also required to suppress the occurrence of cracks.

SUMMARY

Therefore, an aspect of the present disclosure is to provide a multilayer electronic component capable of improving the high temperature load life and suppressing the occurrence of cracks.

A multilayer electronic component according to an aspect of the present disclosure includes: a plurality of dielectric layers; and a plurality of electrode layers. The plurality of dielectric layers and the plurality of electrode layers are alternately stacked, and a skewness of a distribution of thicknesses of the plurality of dielectric layers at a plurality of arbitrary locations of the plurality of dielectric layers is 0.2 or more.

In the multilayer electronic component, the skewness of the distribution of the thicknesses of the dielectric layers at a plurality of arbitrary locations of the plurality of dielectric layers is 0.2 or more. Accordingly, the thickness distribution is biased to the left side (thin side), and the variation in thickness on the thin side is reduced. As a result, it is possible to reduce a thin portion of the dielectric layer and accordingly, it is possible to improve the high temperature load life. In addition, when the skewness is 0.2 or more, the tail on the right side (thick side) of the thickness distribution is long, so that the dielectric layer can include a thick portion. As a result, the contact area between the dielectric layer and the electrode layer can be increased to secure the bonding strength and accordingly, it is possible to suppress the occurrence of cracks. Therefore, according to the multilayer electronic component, it is possible to improve the high temperature load life and suppress the occurrence of cracks.

The skewness of the distribution may be 0.6 or less. In this case, it is possible to suppress the occurrence of a situation in which the variation in the capacitance formed by the dielectric layers increases due to the excessively large skewness.

The kurtosis of the distribution may be 3.2 or more. In this case, since the tail of the thickness distribution can be made thicker, and the dielectric layer can include many thick portions. As a result, it is possible to further suppress the occurrence of cracks.

The kurtosis of the distribution may be 5.0 or less. In this case, it is possible to suppress the occurrence of a situation in which the variation in the capacitance formed by the dielectric layers increases due to the excessively large kurtosis.

An average value of the thicknesses of the plurality of dielectric layers may be 0.4 μm or less. When the dielectric layer is thin as described above, a high electric field strength acts on the dielectric layer, so that the high temperature load life tends to decrease. In addition, since the percentage of the electrode layers in the multilayer electronic component is relatively increased, cracks are likely to occur. In contrast, according to the multilayer electronic component, even in such a case, it is possible to improve the high temperature load life and suppress the occurrence of cracks.

According to the aspect of the present disclosure, it is possible to provide a multilayer electronic component capable of improving the high temperature load life and suppressing the occurrence of cracks.

DETAILED DESCRIPTION

Figure 1:
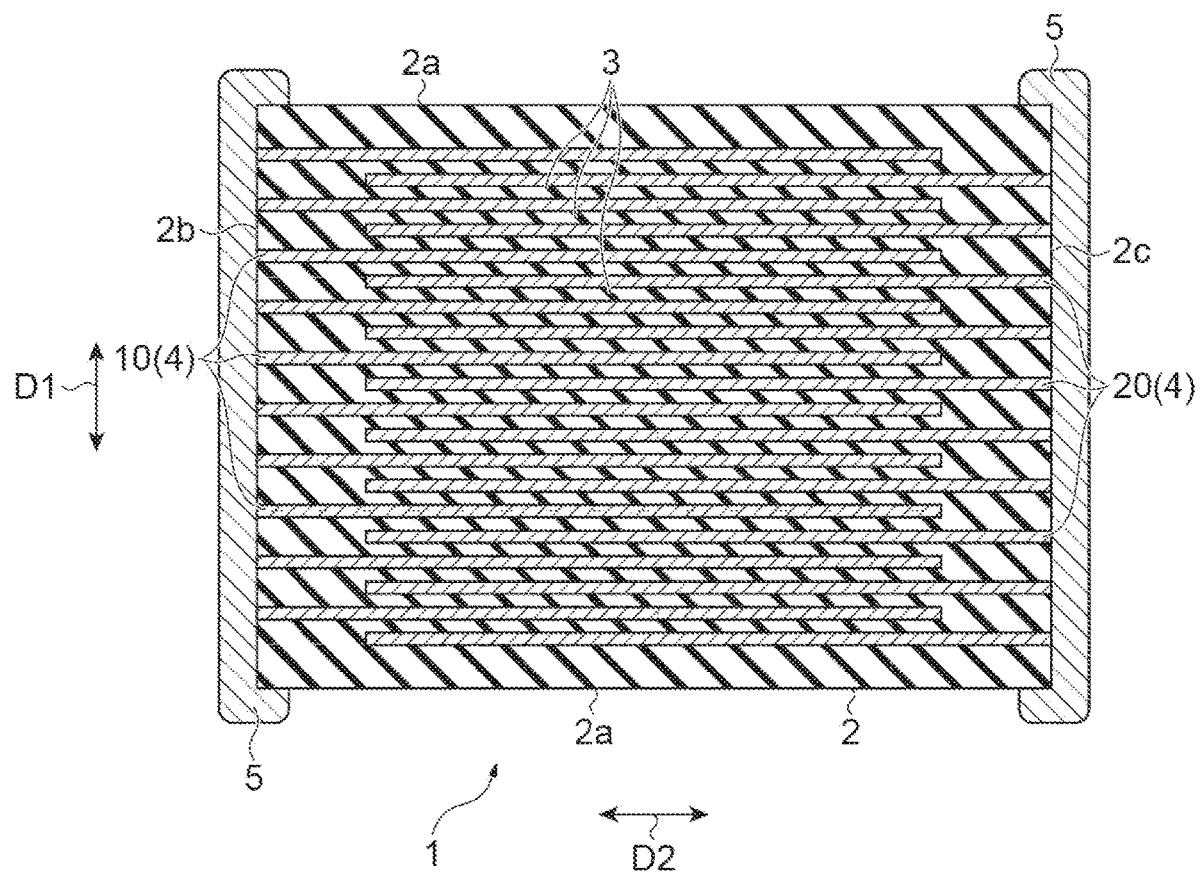
FIG. 1 is a cross-sectional view of a multilayer electronic component of an embodiment.

Hereinafter, an embodiment of the present disclosure will be described in detail with reference to the diagrams. In the following description, the same or equivalent elements are denoted by the same reference numerals, and repeated description thereof will be omitted.

Structure of a Multilayer Electronic Component

FIG. 1 shows a multilayer electronic component 1 that is a multilayer ceramic capacitor. The multilayer electronic component 1 includes an element body 2. The element body 2 is formed, for example, in a substantially rectangular parallelepiped shape. The element body 2 has a pair of main surfaces 2a, a first side surface 2b, and a second side surface 2c. The pair of main surfaces 2a oppose each other in a first direction D1. The first side surface 2b and the second side surface 2c oppose each other in a second direction D2 perpendicular to the first direction D1. One main surface 2a forms a mounting surface. For example, the multilayer electronic component 1 is mounted on a mounting target (for example, an electronic component or a substrate, and the like.) by soldering at one main surface 2a. The multilayer electronic component 1 is, for example, an in-vehicle multilayer electronic component that is mounted on a vehicle and used. In this case, the multilayer electronic component 1 is required to have a long high temperature load life.

The element body 2 has a plurality of dielectric layers 3 and a plurality of electrode layers 4. The plurality of electrode layers 4 include a first electrode layer 10 and a plurality of second electrode layers 20. Each dielectric layer 3 is configured as, for example, a sintered body of a ceramic green sheet (dielectric sheet) containing a dielectric material ($BaTiO_3$-based dielectric ceramic, $Ba(Ti, Zr)O_3$-based dielectric ceramic, $(Ba, Ca)TiO_3$-based dielectric ceramic, $CaZrO_3$-based dielectric ceramic, $(Ca, Sr)(Zr, Ti)O_3$-based dielectric ceramic, and the like). In the actual element body 2, the dielectric layers 3 adjacent to each other are integrated to such an extent that the boundary therebetween cannot be visually recognized. The average value of the thicknesses of the plurality of dielectric layers 3 is, for example, 10 μm or less, and in this example, 0.4 µm or less. The element body 2 includes, for example, at least 10 or 20 or more dielectric layers 3.

The plurality of dielectric layers 3 and the plurality of electrode layers 4 are alternately stacked along the first direction D1. In this example, the plurality of first electrode layers 10 and the plurality of second electrode layers 20 are alternately arranged so as to face each other via the dielectric layer 3 in the first direction D1. The first electrode layer 10 extends to reach the first side surface 2b of the element body 2, and the second electrode layer 20 extends to reach the second side surface 2c of the element body 2.

The electrode layer 4 is formed of a conductive material such as Ni, Cu, Ag, Pd, or an alloy thereof. The electrode layer 4 is configured as, for example, a sintered body of a conductive paste (conductive layer) containing the conductive material. The electrode layer 4 functions as an internal electrode arranged in the element body 2. The first electrode layer 10 and the second electrode layer 20 have different polarities. In the multilayer electronic component 1, a capacitance is formed by the first electrode layer 10 and the second electrode layer 20 facing each other.

The multilayer electronic component 1 further includes a pair of external electrodes 5 that are electrically connected to the mounting target. The pair of external electrodes 5 are formed on the first side surface 2b and the second side surface 2c of the element body 2, respectively. One external electrode 5 is electrically connected to the first electrode layer 10 on the first side surface 2b, and the other external electrode 5 is electrically connected to the second electrode layer 20 on the second side surface 2c.

Method of Manufacturing a Multilayer Electronic Component

When manufacturing the multilayer electronic component 1, first, a plurality of dielectric sheets are prepared (preparation step). The dielectric sheet is a ceramic member that becomes the dielectric layer 3 after baking. Then, a plurality of dielectric sheets and a plurality of conductive layers are alternately stacked (stacking step). The conductive layer is a layer that becomes the electrode layer 4 after baking, and is, for example, a conductive paste.

Subsequently, the stacked body obtained by the stacking step is pressed in the first direction D1 (pressing step). By the pressing step, adjacent layers are integrated with each other, so that a chip having a predetermined size can be obtained. Incidentally, a plurality of chips having a predetermined size may be obtained by pressing a stacked body having a plurality of portions, each of which becomes a chip after cutting, in a pressing step, and then cutting the stacked body. Then, each chip is baked to obtain the element body 2. Thereafter, the multilayer electronic component 1 is obtained through a step of providing the external electrode 5 on the outer surface of the element body 2 and the like.

Skewness and Kurtosis of Distribution of Thicknesses of Dielectric Layers

In the multilayer electronic component 1, the skewness of the distribution of the thicknesses of the dielectric layers 3 at a plurality of arbitrary locations of the plurality of dielectric layers 3 is 0.2 or more and 0.6 or less, and the kurtosis of the distribution at the plurality of arbitrary locations of the plurality of dielectric layers 3 is 3.2 or more and 5.0 or less. Hereinafter, explanation on this point will be given.

Figure 2:
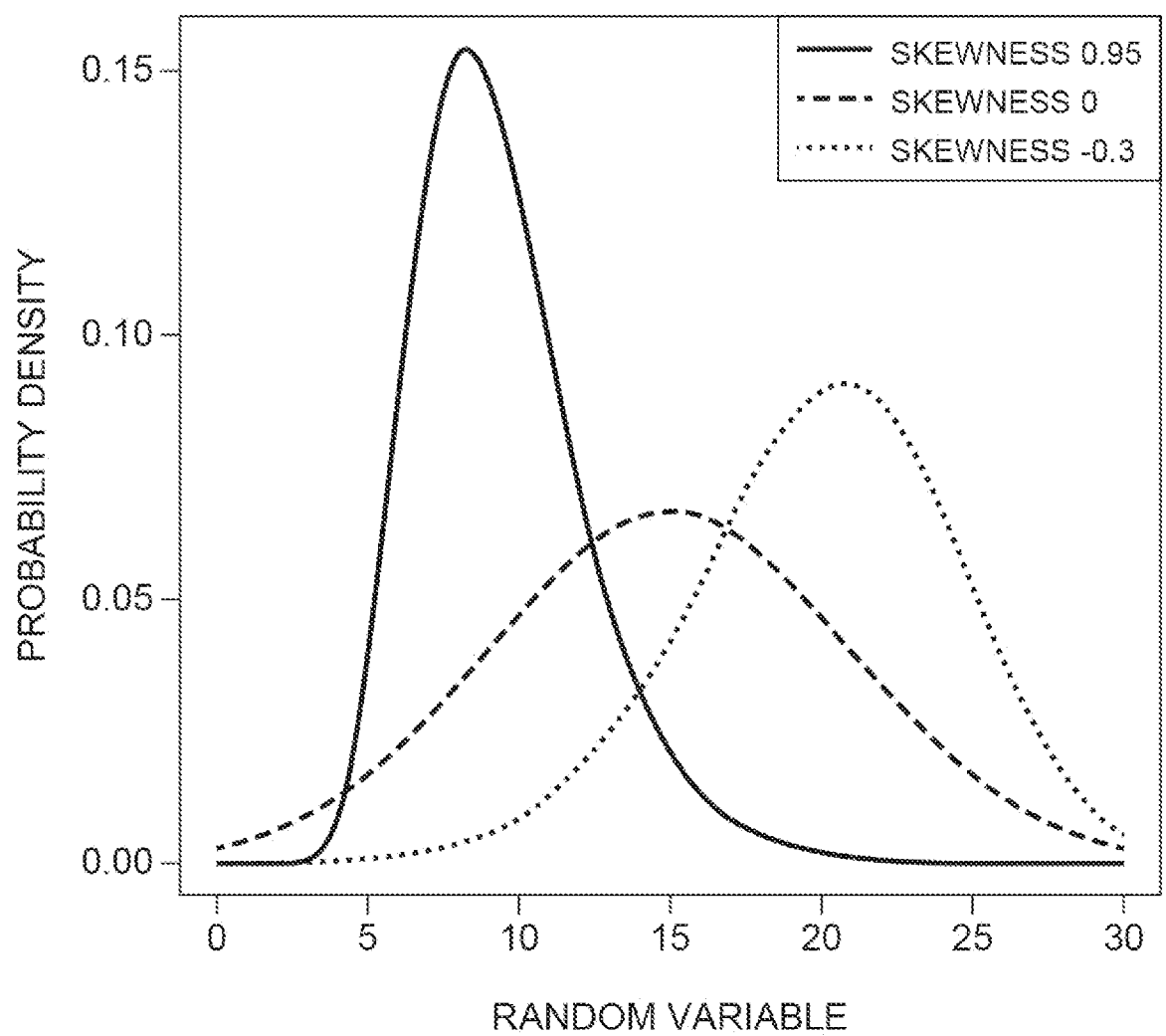
FIG. 2 is a graph for explaining skewness.
Figure 3:
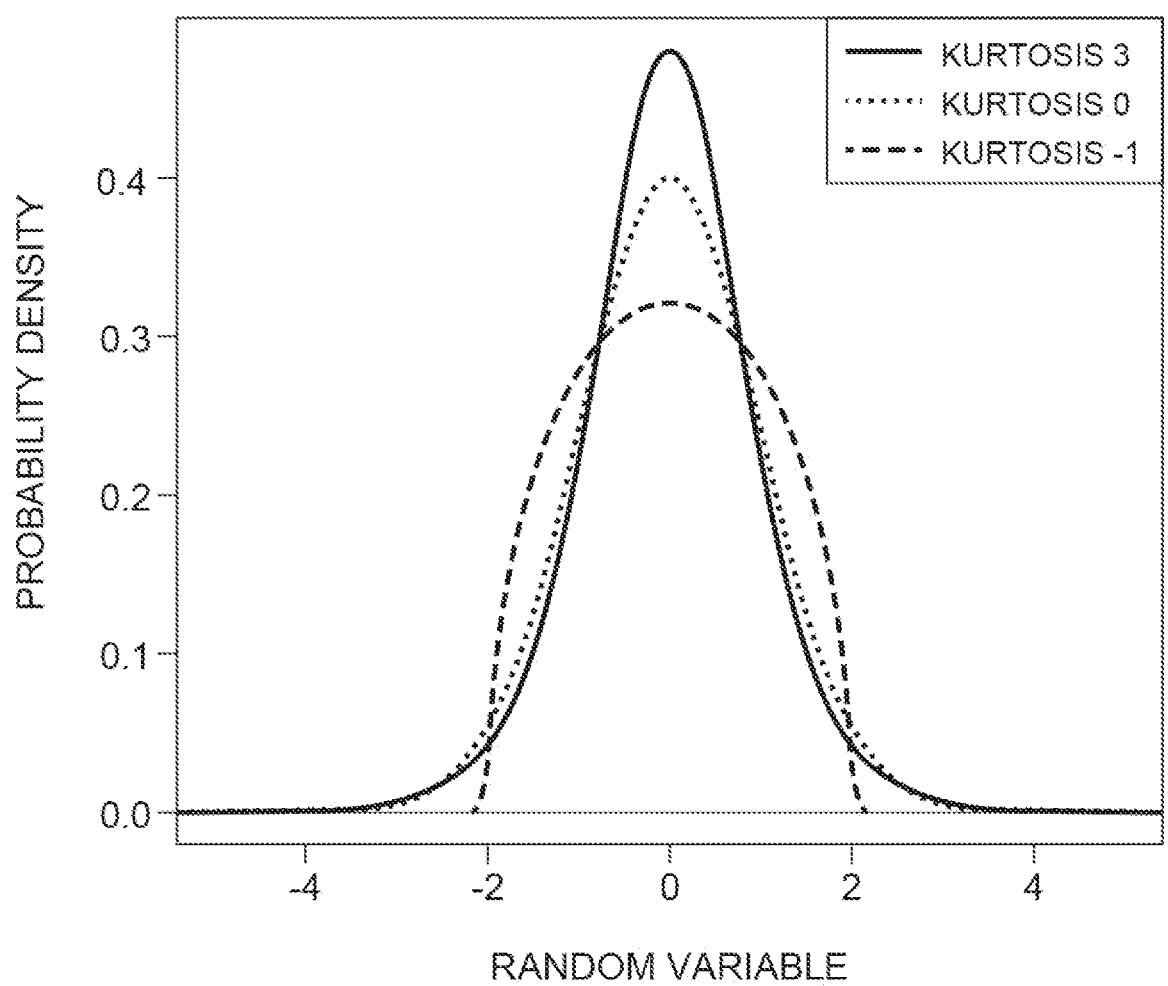
FIG. 3 is a graph for explaining kurtosis.

FIG. 2 is a graph for explaining skewness, and FIG. 3 is a graph for explaining kurtosis (reference: Cain, Meghan K., Zhiyong Zhang, and Ke-Hai Yuan, "Univariate and multivariate skewness and kurtosis for measuring nonnormality: Prevalence, influence and estimation." Behavior research methods 49.5 (2017), 1716-1735). The skewness A of the probability distribution that a random variable X follows is defined by Equation (1), and the kurtosis B is defined by Equation (2).

$$A = \frac{E(X-\mu)^3}{\sigma^3} \quad (1)$$

$$B = \frac{E(X-\mu)^4}{\sigma^4} \quad (2)$$

In Equations (1) and (2), E(X) is an expected value of the random variable X, µ is a mean value of the random variable X, and σ is a standard deviation of the random variable X. The skewness is a measure of asymmetry, and is zero when the probability distribution is a normal distribution. The kurtosis is a measure of the degree of sharpness, and is 3 when the probability distribution is a normal distribution. That is, in this specification, the kurtosis is defined to be 3 when the probability distribution is a normal distribution, unlike the excess kurtosis that is zero when the probability distribution is a normal distribution.

FIG. 2 shows three probability distributions with skewness of 0.95, 0, and −0.3. As shown in FIG. 2, when the skewness is a positive value, the distribution is biased to the left side (the side with a small random variable), and the tail on the right side (the side with a large random variable) of the distribution is long. Therefore, an event with a large random variable corresponding to the right side of the distribution is likely to occur. On the other hand, when the skewness is a negative value, the distribution is biased to the right side, and the tail on the left side of the distribution is long. Therefore, an event with a small random variable corresponding to the left side of the distribution is likely to occur.

FIG. 3 shows three probability distributions with kurtosis of 3, 0, and −1. In all of the probability distributions, the variance is 1. As shown in FIG. 3, when the kurtosis is larger than 3, the tail of the distribution is thicker. That is, an event with an extremely large random variable corresponding to both ends of the distribution is likely to occur.

As described above, in the multilayer electronic component 1, the skewness of the distribution of the thicknesses of the dielectric layers 3 at a plurality of arbitrary locations of the plurality of dielectric layers 3 is 0.2 or more and 0.6 or less, and the kurtosis of the distribution at the plurality of arbitrary locations of the plurality of dielectric layers 3 is 3.2 or more and 5.0 or less. The distribution is calculated as follows, for example. For the multilayer electronic component 1, one image of a cross section along the stacking direction (first direction D1) is acquired. The image is acquired by using, for example, a laser microscope. For a plurality of dielectric layers 3 included in the image, the thickness of the dielectric layer 3 is measured at a plurality of arbitrary locations (for example, 3000 locations). The position for measuring the thickness of the dielectric layer 3 is selected, for example, randomly. However, the thickness of the dielectric layer 3 may be measured at a plurality of positions arranged at predetermined distances. Based on the measured thicknesses, it is possible to calculate the probability distribution with the thickness of the dielectric layer 3 as a random variable.

Figure 4:
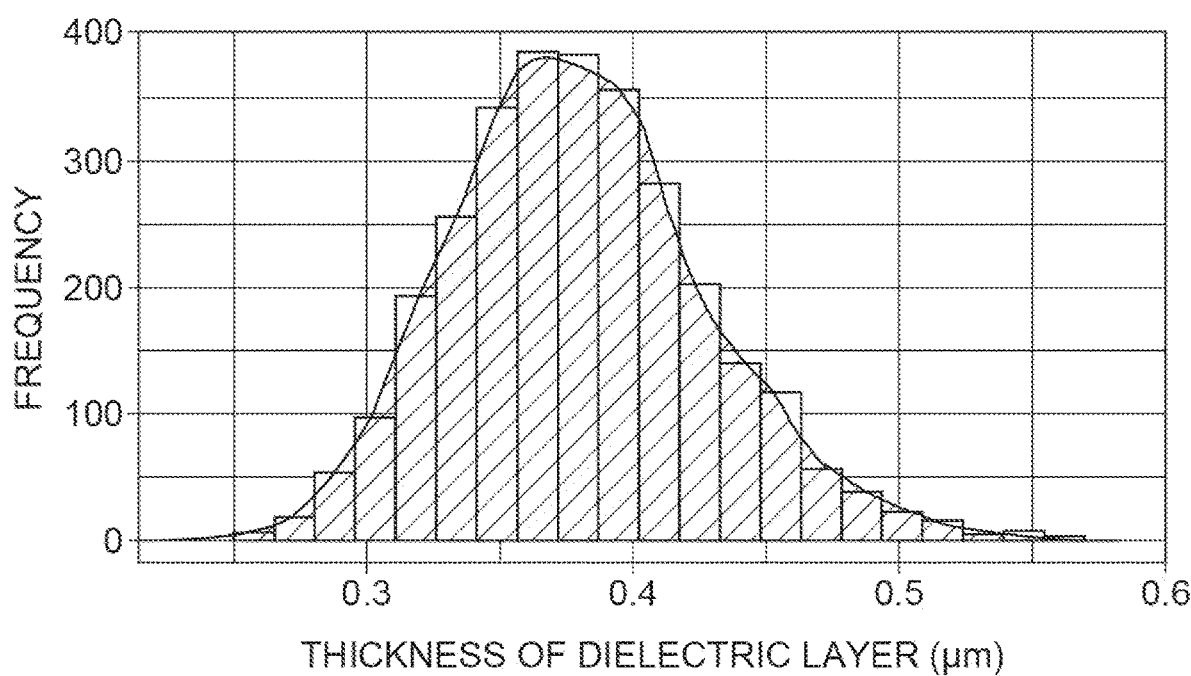
FIG. 4 is a graph showing an example of the distribution of the thicknesses of dielectric layers in the multilayer electronic component of the embodiment.

FIG. 4 is a graph showing an example of the distribution of the thicknesses of the dielectric layers 3 in the multilayer electronic component 1. This distribution is calculated based on the thickness (μm) of the dielectric layer 3 measured at 3000 locations. In this example, the skewness of the distribution is 0.42 and the kurtosis is 3.29. The average value of the thicknesses of the dielectric layers 3 is 0.38 μm, and the standard deviation is 0.05. As described above, in the multilayer electronic component 1, the skewness of the distribution of the thicknesses of the dielectric layers 3 is 0.2 or more and 0.6 or less. In addition, the kurtosis of the distribution is 3.2 or more and 5.0 or less.

The method of adjusting the skewness and the kurtosis will be described. Generally, in the preparation step of the manufacturing process described above, a plurality of dielectric sheets are prepared so that the skewness of the distribution of the thicknesses of the dielectric sheets at a plurality of arbitrary locations of the plurality of dielectric sheets is 0.2 or more and 0.6 or less and the kurtosis of the distribution at the plurality of arbitrary locations of the plurality of dielectric sheets is 3.2 or more and 5.0 or less. As a result, in the stacked body obtained by the stacking step, the skewness of the distribution of the thicknesses of the dielectric sheets is 0.2 or more and 0.6 or less, and the kurtosis of the distribution is 3.2 or more and 5.0 or less. In addition, in the finally obtained multilayer electronic component 1, the skewness of the distribution of the thicknesses of the dielectric layers 3 is 0.2 or more and 0.6 or less, and the kurtosis of the distribution is 3.2 or more and 5.0 or less.

More specifically, in the preparation step, for example, the thickness of each dielectric sheet is measured and a dielectric sheet whose thickness is less than a predetermined threshold value is excluded while a dielectric sheet whose thickness is equal to or greater than the threshold value is not excluded (is used), thereby preparing a plurality of dielectric sheets so that the skewness of the distribution of the thicknesses of the dielectric sheets is 0.2 or more. The thickness of the dielectric sheet is measured by using, for example, X-rays. As the threshold value, for example, a value obtained by measuring the thicknesses of 100 dielectric sheets and multiplying the average value of the thicknesses by a predetermined coefficient (for example, 0.2) can be used. By not using a dielectric sheet whose thickness is less than the threshold value in this manner, it is possible to control the skewness to be 0.2 or more.

In addition, in the preparation step, for example, by using a dielectric sheet in which the content of the dispersant is less than a predetermined value, dielectric sheets are prepared so that the kurtosis of the distribution of the thicknesses of the dielectric sheets is 3.2 or more. By reducing the content of the dispersant in this manner, it is possible to manufacture a dielectric sheet having a large variation in thickness.

Alternatively, in the preparation step, first dielectric sheets having thicknesses whose average value is a first value and second dielectric sheets having thicknesses whose average value is a second value different from the first value may be prepared so that the kurtosis of the distribution of the thicknesses of the dielectric sheets is 3.2 or more. In this case, in the stacking step, the first dielectric sheets and the second dielectric sheets are used as dielectric sheets to be stacked. The kurtosis can also be controlled by stacking dielectric sheets having different thicknesses together with each other in this manner. For example, by preparing a smaller number of second dielectric sheets thicker than the first dielectric sheet (that is, the second value is larger than the first value) than the first dielectric sheets and adding the second dielectric sheets in the stacked body formed mostly by the first dielectric sheets, it is possible to increase the kurtosis as compared with a case where all the dielectric sheets are the first dielectric sheets.

Functions and Effects

In the multilayer electronic component 1, the skewness of the distribution of the thicknesses of the dielectric layers 3 at a plurality of arbitrary locations of the plurality of dielectric layers 3 is 0.2 or more. Accordingly, the thickness distribution is biased to the left side (thin side), and the variation in thickness on the thin side is reduced. As a result, it is possible to reduce a thin portion of the dielectric layer 3 and accordingly, it is possible to improve the high temperature load life. That is, if the dielectric layer 3 contains many portions thinner than the reference value, the high temperature load life may be shortened. However, in the multilayer electronic component 1, since the dielectric layer 3 contains few thin portions, it is possible to improve the high temperature load life. As described above, the high temperature load life is particularly important when the multilayer electronic component 1 is for an in-vehicle use and is used in a high temperature environment. In addition, when the skewness is 0.2 or more, the tail on the right side (thick side) of the thickness distribution becomes long, so that the dielectric layer 3 can include a thick portion. As a result, the contact area between the dielectric layer 3 and the electrode layer 4 can be increased to secure the bonding strength and accordingly, it is possible to suppress the occurrence of cracks. Therefore, according to the multilayer electronic component 1, it is possible to improve the high temperature load life and suppress the occurrence of cracks.

That is, it is considered that normally the distribution of the thicknesses of the dielectric layers in the multilayer ceramic capacitor is close to the normal distribution. In such a multilayer ceramic capacitor, for example, simply reducing the variation in the thickness of the dielectric layer 3 can reduce a thin portion to improve the high temperature load life. However, since the bonding strength between the dielectric layer and the electrode layer decreases, cracks are likely to occur. In contrast, in the multilayer electronic component 1, by setting the skewness of the distribution of the thicknesses of the dielectric layers 3 to 0.2 or more, it is possible to reduce a thin portion in the dielectric layer 3 and accordingly, it is possible to improve the high temperature load life. At the same time, by making the dielectric layer 3 include a thick portion so that the bonding strength between the dielectric layer 3 and the electrode layer 4 is secured, it is possible to suppress the occurrence of cracks. As described above, according to the multilayer electronic component 1, it is possible to improve the high temperature load life and suppress the occurrence of cracks at the same time.

The skewness of the distribution of the thicknesses of the dielectric layers 3 is 0.6 or less. Therefore, it is possible to suppress the occurrence of a situation in which the variation in the capacitance formed by the dielectric layers 3 increases due to the excessively large skewness.

The kurtosis of the distribution of the thicknesses of the dielectric layers 3 is 3.2 or more. Therefore, since the tail of the thickness distribution can be made thicker, and the dielectric layer 3 can include many thick portions. As a result, it is possible to further suppress the occurrence of cracks. That is, since the kurtosis of the distribution of the thicknesses of the dielectric layers 3 is 3.2 or more and the skewness of the distribution of the thicknesses of the dielectric layers 3 is 0.2 or more, it is possible to suppress the occurrence of cracks by making the dielectric layer 3 include many thick portions. At the same time, it is possible to suppress a reduction in high temperature load life by suppressing the increase of a thin portion.

The kurtosis of the distribution of the thicknesses of the dielectric layers 3 is 5.0 or less. Therefore, it is possible to suppress the occurrence of a situation in which the variation in the capacitance formed by the dielectric layers 3 increases due to the excessively large kurtosis.

The average value of the thicknesses of the plurality of dielectric layers 3 is 0.4 µm or less. When the dielectric layer 3 is thin as described above, a high electric field strength acts on the dielectric layer 3, so that the high temperature load life tends to decrease. In addition, since the percentage of the electrode layers 4 in the multilayer electronic component 1 is relatively increased, cracks are likely to occur. In contrast, according to the multilayer electronic component 1, even in such a case, it is possible to improve the high temperature load life and suppress the occurrence of cracks.

The present disclosure is not limited to the embodiment described above. For example, the material and shape of each component are not limited to the materials and shapes described above, and various materials and shapes can be adopted. The multilayer electronic component 1 may be a multilayer piezoelectric actuator, a multilayer varistor, a multilayer thermistor, a multilayer composite component, or the like.

What is claimed is:

1. A multilayer electronic component, comprising:
   a plurality of dielectric layers; and
   a plurality of electrode layers, wherein the plurality of dielectric layers and the plurality of electrode layers are alternately stacked,
   wherein a skewness of a distribution of thicknesses of the plurality of dielectric layers at a plurality of arbitrary locations of the plurality of dielectric layers is 0.2 or more.

2. The multilayer electronic component according to claim 1,
   wherein the skewness of the distribution is 0.6 or less.

3. The multilayer electronic component according to claim 1,
   wherein a kurtosis of the distribution is 3.2 or more.

4. The multilayer electronic component according to claim 3,
   wherein the kurtosis of the distribution is 5.0 or less.

5. The multilayer electronic component according to claim 1,
   wherein an average value of the thicknesses of the plurality of dielectric layers is 0.4 µm or less.

\* \* \* \* \*